United States Patent
Wang et al.

(10) Patent No.: US 10,910,656 B2
(45) Date of Patent: Feb. 2, 2021

(54) TRIBLOCK COPOLYMER BASED ANION EXCHANGE MEMBRANES (AEMS) AS SEPARATORS IN ELECTROCHEMICAL DEVICES

(71) Applicants: Zhongyang Wang, St. Louis, MO (US); Javier Parrondo, St. Louis, MO (US); Vijay K. Ramani, St. Louis, MO (US)

(72) Inventors: Zhongyang Wang, St. Louis, MO (US); Javier Parrondo, St. Louis, MO (US); Vijay K. Ramani, St. Louis, MO (US)

(73) Assignee: Washington University, St. Louis, MO (US)

( * ) Notice: Subject to any disclaimer, the term of this patent is extended or adjusted under 35 U.S.C. 154(b) by 22 days.

(21) Appl. No.: 16/052,973

(22) Filed: Aug. 2, 2018

(65) Prior Publication Data

US 2019/0044158 A1 Feb. 7, 2019

Related U.S. Application Data

(60) Provisional application No. 62/541,482, filed on Aug. 4, 2017.

(51) Int. Cl.
| | |
|---|---|
| *H01M 8/02* | (2016.01) |
| *H01M 8/18* | (2006.01) |
| *H01M 4/38* | (2006.01) |
| *C08J 5/22* | (2006.01) |
| *H01M 4/36* | (2006.01) |
| *H01M 8/0221* | (2016.01) |

(52) U.S. Cl.
CPC ......... *H01M 8/0221* (2013.01); *C08J 5/2243* (2013.01); *H01M 4/368* (2013.01); *H01M 4/38* (2013.01); *H01M 8/188* (2013.01); *C08J 2353/00* (2013.01); *C08J 2353/02* (2013.01)

(58) Field of Classification Search
CPC ...... H01M 8/0221; H01M 8/188; H01M 4/38; H01M 4/368; C08J 5/2243; C08J 2353/00; C08J 2353/02
USPC .......................................................... 521/27
See application file for complete search history.

(56) References Cited

U.S. PATENT DOCUMENTS

| | | |
|---|---|---|
| 2010/0270158 A1 | 10/2010 | Logan |
| 2014/0326611 A1 | 11/2014 | Yan et al. |
| 2017/0149080 A1 | 5/2017 | Yan et al. |
| 2017/0203289 A1 | 7/2017 | Bae et al. |
| 2017/0252707 A1 | 9/2017 | Bahar et al. |

FOREIGN PATENT DOCUMENTS

| | | | |
|---|---|---|---|
| CN | 106883327 A | * | 6/2017 |
| IN | 2011CH00580 A | * | 3/2011 |

OTHER PUBLICATIONS

Zeng et al. "Anion exchange membranes based on quaternized polystyrene-block-poly(ethylene-ran-butylene)-block-polystyrene for direct methanol alkaline fuel cells", Journal of Membrane Science (2010), 349 (1-2), 237-243 (Year 2010).*

Vinodh et al. "Quaternized poly(styrene ethylene butylene polystyrene)/ multiwalled carbon nanotube composites for alkaline fuel cell applications", Journal of Nanoscience and Nanotechnology (2013), 13(8), 5522-5533 (2013).*

Dai etal. "Cross-Linked Quaternized Poly(styrene-b-(ethylene-cobutylene)-b-styrene) for Anion Exchange Membrane: Synthesis, Characterization and Properties", ACS Appl. Mater. Interfaces 2016, 8, 20329-20341, www.acsami.org. (Year: 2016).*

Yang etal. "Highlystable polyethylene glycol)-grafted alkaline anion exchange membranes", J. Mater. Chem. A, 2016, 4, 3886-3892. (Year: 2016).*

Zeng etal. "Anion exchange membranes based on quaternized polystyrene-block-poly(ethylene-ran-butylene)-block-polystyrene for direct methanol alkaline fuel cells", Journal of Membrane Science (2010), 349 (1-2), 237-243. (Year: 2016).*

Vinodh etal. "Quaternized polystyrene ethylene butylene polystyrene)/ multiwalled carbon nanotube composites for alkaline fuel cell applications", Journal of Nanoscience and Nanotechnology (2013), 13(8), 5522-5533. (Year: 2013).*

Dekel, Dario R., "Review of cell performance in anion exchange membrane fuel cells", Journal of Power Sources, 2018, vol. 375, pp. 158-169.

Mohanty et al., "Stable Elastomeric Anion Exchange Membranes Based on Quaternary Ammonium-Tethered Polystyrene-b-poly(ethylene-cobutylene)-b-polystyrene Triblock Copolymers", Macromolecules, 2015, vol. 48, pp. 7085-7095.

Sun et al., "Novel nanostructured high-performance anion exchange ionomers for anion exchange membrane fuel cells", Journal of Power Sources, 2012, vol. 202, pp. 70-77.

Vinodh et al, "A novel anion exchange membrane from polystyrene (ethylene butylene)polystyrene: Synthesis and characterization", Material Science and Engineering B, 2010, vol. 167, pp. 43-50.

Wang et al., "Polystyrene-Block-Poly(ethylene-ran-butylene)-Block-Polystyrene Triblock Copolymer Separators for a Vanadium-Cerium Redox Flow Battery", Journal of The Electrochemical Society, 2017, vol. 164, No. 4, pp. F372-F378.

* cited by examiner

*Primary Examiner* — Michael Bernshteyn
(74) *Attorney, Agent, or Firm* — Armstrong Teasdale LLP

(57) ABSTRACT

The present disclosure is directed to triblock copolymer based anion exchange membranes (AEMs) and methods for making same. The membranes are useful as separators in electrochemical devices, such as fuel cells, electrolyzers, and redox flow batteries.

11 Claims, 13 Drawing Sheets

TRIBLOCK COPOLYMER BASED ANION EXCHANGE MEMBRANES (AEMS) AS SEPARATORS IN ELECTROCHEMICAL DEVICES

CROSS REFERENCE TO RELATED APPLICATIONS

This application claims priority to U.S. Provisional Patent Application No. 62/541,482 filed Aug. 4, 2017, which is hereby incorporated by reference in its entirety.

STATEMENT REGARDING FEDERALLY SPONSORED RESEARCH & DEVELOPMENT

This invention was made with government support under grant number DE-AR0000768 awarded by United States Department of Energy and N00014-16-1-2833 awarded by the Office of Naval Research. The government has certain rights in the invention.

BACKGROUND OF THE DISCLOSURE

There is a growing interest in using anion exchange membranes (AEMs) as separators in alkaline membrane fuel cells (AMFCs) and in other energy conversion and storage systems such as redox flow batteries (RFBs), alkaline water electrolyzers (AWEs) and reverse electrodialysis (RED) cells.

RFBs are promising candidates for large-scale energy storage systems since the capacity, power and energy density parameters are designed independently and easily modified even after installation. Original work on the iron/chromium RFB was performed by NASA researchers in 1970s. Over the past few decades, several redox couples have been studied for RFB applications, including all-vanadium, all-uranium, iron-vanadium, iron-chromium, zinc-nickel, zinc-cerium, and zinc-bromine. Among these redox couples, the all-vanadium redox flow battery (VRFB) has been considered the most reliable RFB system due to its long-life and mild operating temperature range. Moreover, intermixing of negative and positive electrolyte does not cause irreversible damage in the VRFB.

The drawbacks of VRFBs include their low standard cell voltage (1.26V) and the relatively low solubility of vanadium salts (typically 1.5M in common acids, such as sulfuric acid), which limit their specific capacity and energy density. Hydrocarbon-based membrane separators also suffer from oxidative degradation caused by the vanadium (V) cation. This required the use of fluorocarbon-based membranes as separators. The expensive vanadium salts and the high cost of the fluorocarbon-based separators have limited the commercialization of VRFBs.

Alternative redox species/couples could alleviate some of these issues. By using an AEM-separator, it is possible to operate "electrode-decoupled" RFBs with different redox elements at the anode and cathode. The vanadium-cerium redox flow battery (V—Ce RFB) has relative high cell voltage ($Ce^{4+}/Ce^{3+}$ has standard potential of 1.44V vs. SHE compared with $V^{5+}/V^{4+}$ at 1V vs. SHE), good reversibility and acceptable energy density. Prior work has been done on V—Ce RFB using AEM separators. Cardo-poly-(ether ketone)-based AEMs have been developed and employed as separators in a V—Ce RFB. Over 20 charge/discharge cycles, the RFB with the cardo-poly-(ether ketone)-based AEM separator yielded unchanged efficiencies and capacity, while loss in capacity was about 50% for the benchmark NAFION®212 separator.

Ion-containing block copolymers have provided clear evidence that the phase separation between hydrophilic and hydrophobic phases produces materials with excellent ionic conductivity. Styrene block-copolymers (such as polystyrene-block-poly(ethylene-ran-butylene)-block-polystyrene, SEBS) have attracted considerable attention given their high thermal and chemical stability and tunable mechanical properties. Attempts to synthesize SEBS-based AEMs have used a variety of techniques. However, the chloromethylation of SEBS did not yield high degrees of functionalization (DF) and sometimes resulted in gelation when high DF values were attempted. Various coupling reactions have been used to functionalize SEBS, thereby obtaining AEMs with ion exchange capacities (IECs) of ca. 2.2 mmol/g and a chloride ionic conductivity of 13 mS/cm at 30° C.

The most commonly used cation in AEMs is the benzyl trimethylammonium cation. The derivative AEMs are easy to synthesize due to the basicity of trimethylamine (TMA), which allows it to react easily with halogenated polymers through the $SN_2$ pathway, resulting in membranes that exhibit relatively large IECs and good ionic conductivities. Other alternatives generally yield much lower ionic conductivities.

The mechanical properties (ultimate strength and elongation at break) of the separator are very important for applications where the membranes will be assembled in cells with relatively large active areas, wherein they are exposed to stresses that could result in deformation. The mechanical properties of tri-block copolymers (e.g. polystyrene-block-poly(ethylene-ran-butylene)-block-polystyrene (SEBS)) are tuned by changing the proportion of styrene, which provides rigidity, to ethylene-butylene copolymers, which provides elasticity.

Accordingly, there is a need: 1) to synthesize SEBS-based AEMs with high ionic conductivity while minimizing ohmic losses during RFB operation; 2) to efficiently separate decoupled anolyte and catholyte solutions containing different elemental species so that (irreversible) intermixing is minimized; and 3) to achieve stable AEMs in conditions resembling those encountered in RFBs (acidic, with selected metal cations present). The embodiments described herein resolve at least these known deficiencies.

BRIEF DESCRIPTION OF THE DISCLOSURE

In one aspect, the present disclosure is directed to an anion exchange membrane (AEM) comprising a chloromethylated polystyrene-block-poly(ethylene-ran-butylene)-block-polystyrene (SEBS) triblock copolymer, and one or more functionalizing cations.

In another aspect, the present disclosure is directed to a method for preparing an anion exchange membrane (AEM). The method comprises chloromethylating a polystyrene-block-poly(ethylene-ran-butylene)-block-polystyrene (SEBS) triblock copolymer, and functionalizing the SEBS triblock copolymer with at least one cation.

In yet another aspect, the present disclosure is directed to a separator for an electrochemical device comprising an anion exchange membrane (AEM). The AEM comprises a chloromethylated polystyrene-block-poly(ethylene-ran-butylene)-block-polystyrene (SEBS) triblock copolymer, and one or more functionalizing cations.

BRIEF DESCRIPTION OF THE DRAWINGS

The embodiments described herein may be better understood by referring to the following description in conjunction with the accompanying drawings.

DETAILED DESCRIPTION OF THE DISCLOSURE

The present disclosure is based, at least in part, on the discovery that triblock copolymer based anion exchange membranes (AEMs) function as separators in electrochemical devices. As shown herein, the present disclosure provides for novel, tunable polymeric separators for electrochemical devices (e.g., fuel cells, electrolyzers, flow batteries, various water desalination systems (e.g., electrodialysis, capacitive deionization) and others).

One aspect of the present disclosure provides for the modification (using novel cations) of a poly(styrene)-block-poly(ethylene-ran-butylene)-block-poly(styrene) (SEBS) triblock copolymer (available commercially). Chemically stable anion exchange membranes with high ionic conductivity are efficient separators in multiple electrochemical devices.

The present disclosure provides for a new process for the chloromethylation of SEBS. The amount of styrene acts as one of the parameters to "tune" polymer properties (physical strength, water uptake, degree of functionalization). In some embodiments, the chloromethylated SEBS product is functionalized with several different novel cations. The cation selection is the second "tuning" parameter. Use of the functionalized product (an anion exchange membrane) in various electrochemical systems resulting in improved lifetime of redox flow batteries, lower electricity consumption for various water desalination technologies and improved chemical stability allows for applications in a variety of electrochemical systems in harsh acidic or alkaline environments. In some embodiments, the functionalizing cations comprise at least one trimethylamine (TMA) cation.

This class of tunable membranes, which exceed the performance of state-of-the-art commercial membranes, finds wide application in the water desalination, hydrogen production, and energy storage markets, for example. The membranes also function in fuel cells, electrolyzers, and in various water desalination technologies such as membrane capacitive deionization and electrodialysis. The presently disclosed compositions and methods encompass scale-up for commercial membrane manufacturing and whole electrochemical stack manufacturing (e.g., for water desalination, water electrolysis or for redox flow batteries). The presently disclosed compositions and methods further encompass membrane manufacturing, flow battery manufacturing, whole redox flow battery (RFB) stack, membrane manufacturing, electrolyzer technology and fuel cell technology.

Figure 1:
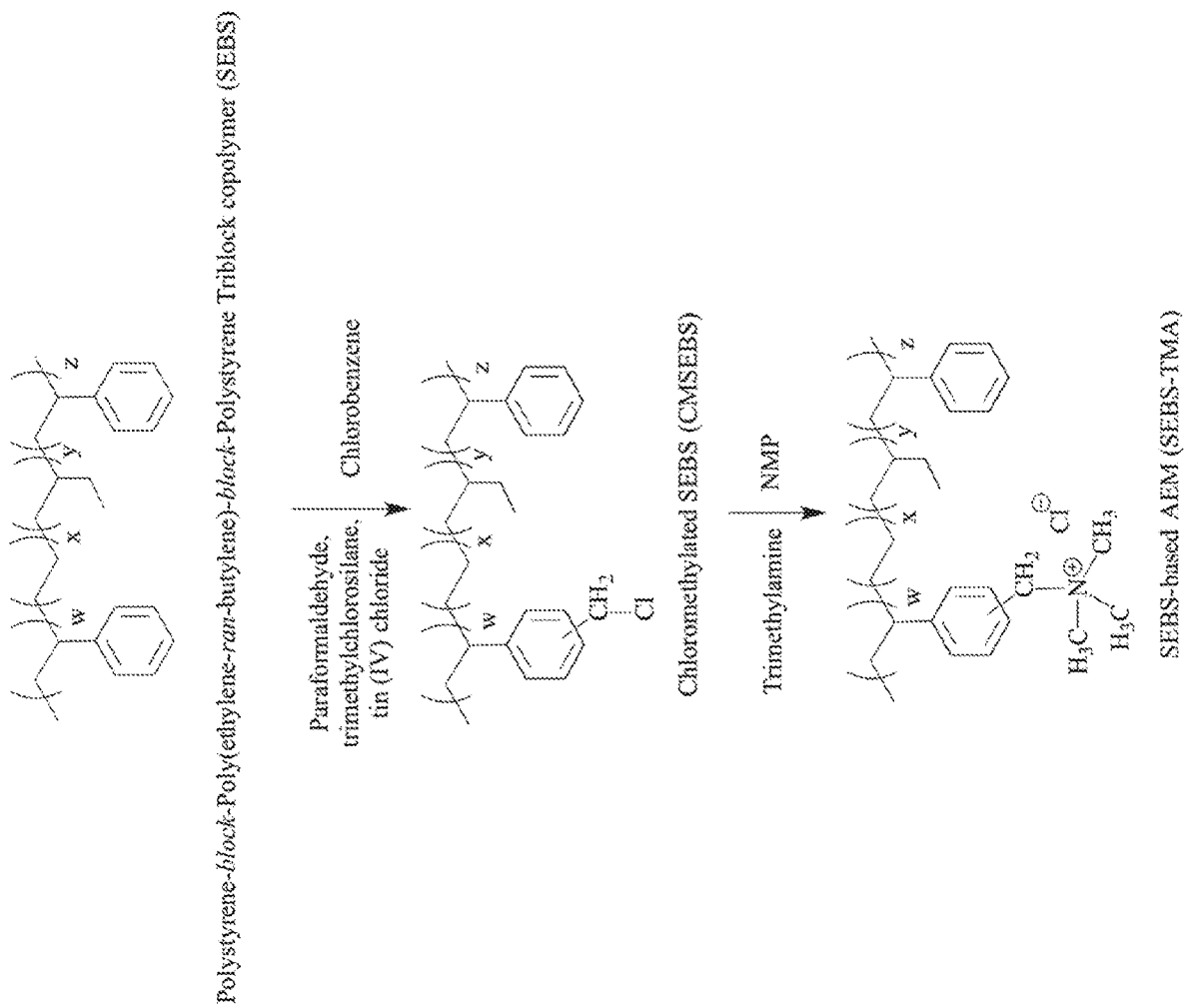
FIG. 1 is an exemplary embodiment of a scheme for the chloromethylation of SEBS and the synthesis of SEBS-based AEMs in accordance with the present disclosure.
Figure 2:
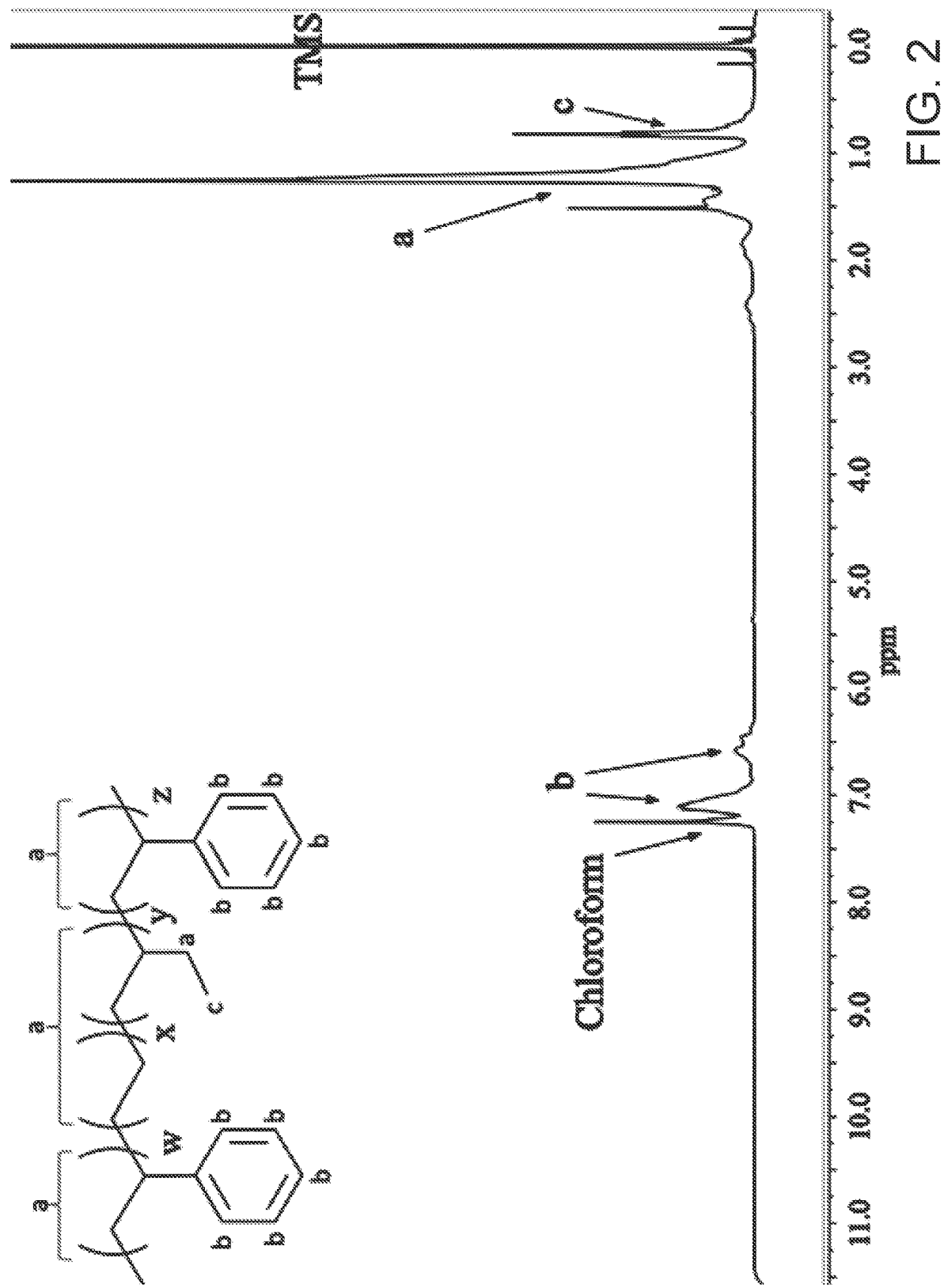
FIG. 2 is an exemplary embodiment of the $^1$H NMR spectrum of SEBS in accordance with the present disclosure.
Figure 3:
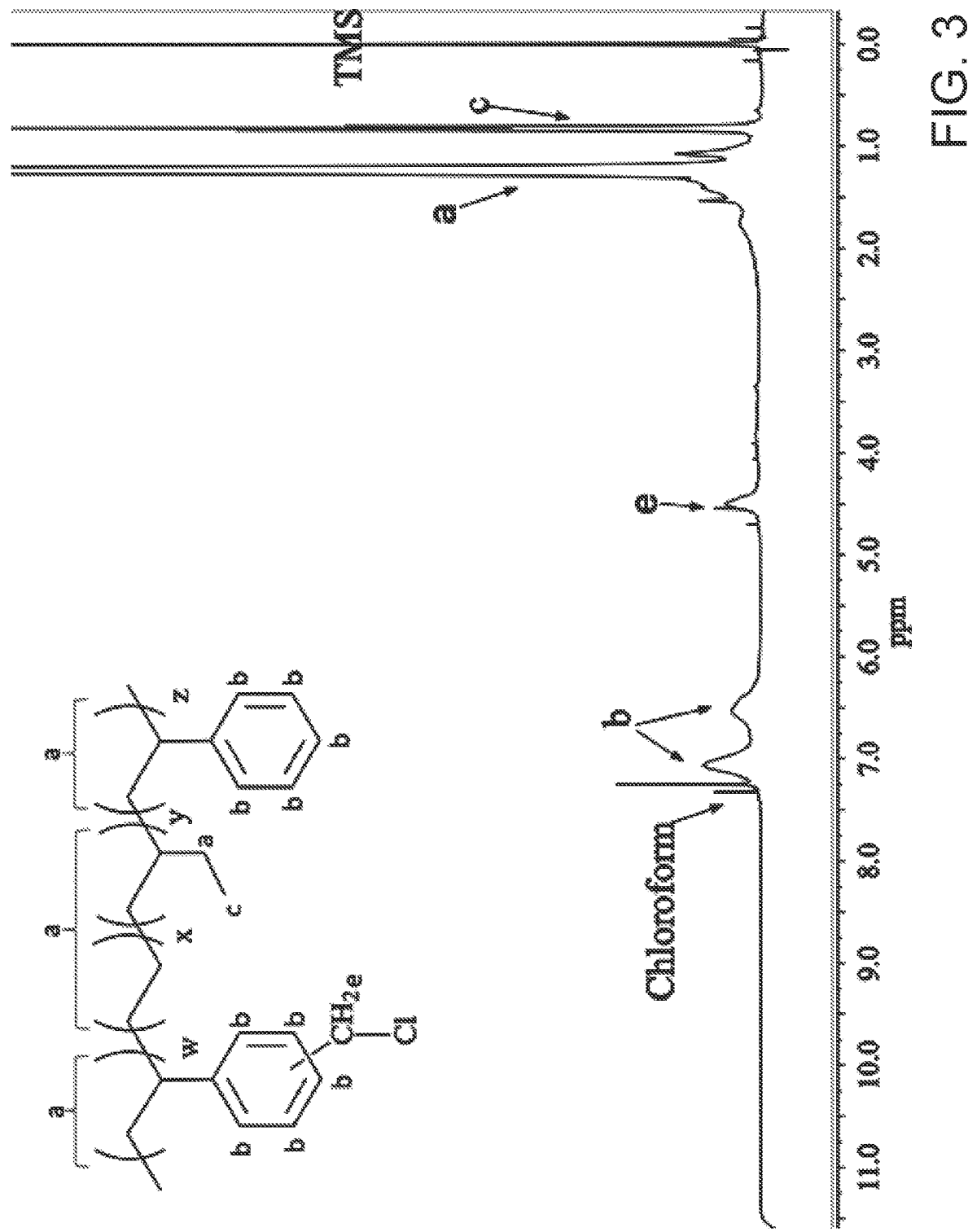
FIG. 3 is an exemplary embodiment of the $^1$H NMR spectrum of CMSEBS30 in accordance with the present disclosure.

A backbone-functionalization method is described herein that is more easily achieved than those previously utilized. The chloroform commonly employed as solvent during the chloromethylation reaction was replaced by chlorobenzene, allowing the reaction to be carried out at higher temperatures (80° C.) thereby increasing the reaction rate. This procedure achieves AEMs (after quaternization of the chloromethylated polymer) with an IEC of up to 1.93 mmol/g, resulting in a chloride ion conductivity of 16 mS/cm (at 30° C.). FIG. 1 shows the scheme followed for the synthesis of the AEM. FIG. 2 shows the $^1$H NMR spectrum of SEBS and FIG. 3 shows $^1$H NMR spectrum of chloromethylated SEBS with a 30:70 molar ratio of styrene to rubber (CMSEBS30). Peaks a and c correspond to the protons on aliphatic backbone. Peaks b and d correspond to the protons the aromatic ring. The $^1$H NMR experiment was performed in chloroform-d with TMS, which was used as an internal standard for calibrating the chemical shift of $^1$H. A new peak "e" at a chemical shift of ca. 4.5 ppm, corresponding to the protons in the chloromethyl group, as shown in FIG. 3 (2H, multiplet). The presence of the peak e confirmed the chloromethylation of SEBS30. The DF value for CMSEBS30 was calculated by using equation:

$$\frac{\frac{Area(e)}{2}}{Area(b) + \frac{Area(e)}{2}} \times 0.3 \qquad [1]$$

Figure 4:
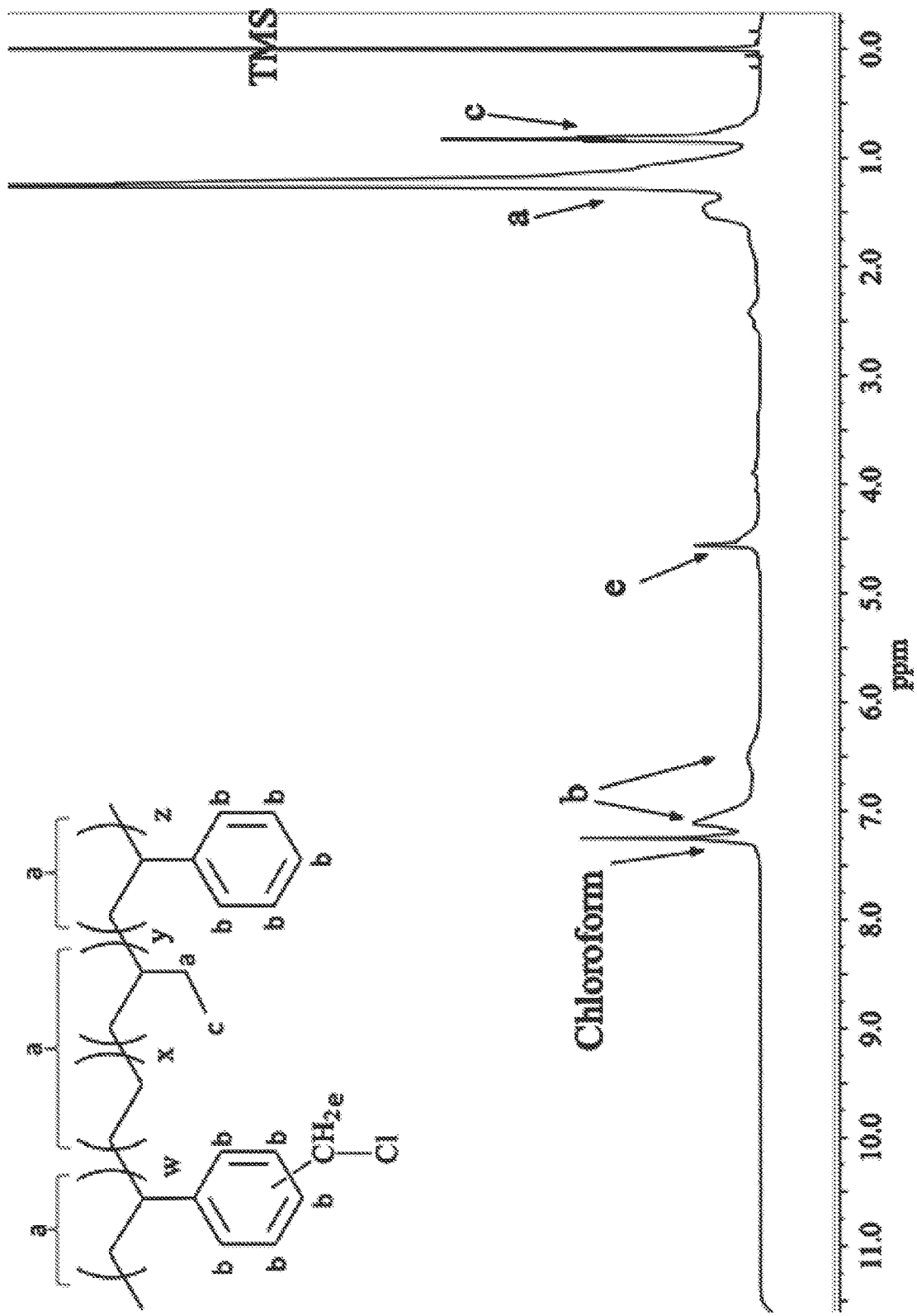
FIG. 4 is an exemplary embodiment of the $^1$H NMR spectrum of CMSEBS35 in accordance with the present disclosure.

The $^1$H NMR experiment was performed in chloroform-d with TMS, which was used as an internal standard for calibrating the chemical shift of $^1$H. The DF was estimated to be 0.16 mols of chloromethyl groups/mol of polymer repeat unit. FIG. 4 shows the $^1$H NMR of the chloromethylated SEBS polymer with a 35:65 molar ratio of styrene to rubber (CMSEBS35). The new peak e demonstrated that the chloromethylation reaction occurred in the SEBS. The DF value for CMSEBS35 was calculated by using equation:

$$\frac{\frac{\text{Area}(e)}{2}}{\text{Area}(b) + \frac{\text{Area}(e)}{2}} \times 0.35 \qquad [2]$$

Here again, the $^1$H NMR experiment was performed in chloroform-d with TMS, which was used as an internal standard for calibrating the chemical shift of $^1$H. The DF for this polymer was calculated to be 0.22 mol/mol. CMSEBS30 and CMSEBS35 were reacted with TMA to obtain the following AEMs: SEBS30-TMA, SEBS35-TMA (reaction schemes in FIG. 1). Since the AEMs could not be dissolved in the common deuterated solvents, it was not possible to confirm the reaction outcome by using NMR spectroscopy. Instead, FTIR was employed to confirm the formation of the desired AEMs.

In some embodiments, the triblock copolymer has a molar ratio of styrene to rubber of from about 30:70 to about 95:5, from about 30:70 to about 55:45, about 35:65, or about 30:70. In some embodiments, the AEM has a chloride ion conductivity at 70° C. of from about 15 mS/cm to about 115 mS/cm, from about 15 mS/cm to about 90 mS/cm, from about 15 mS/cm to about 60 mS/cm, from about 15 mS/cm to about 30 mS/cm, or about 17 mS/cm.

In some embodiments, the AEM has an ion exchange capacity (IEC) of from about 1.30 to about 2.15 mmol/g, from about 1.30 mmol/g to about 1.75 mmol/g, or about 1.35 mmol/g. In some embodiments, the triblock copolymer has a degree of functionalization (DF) of from about 0.15 to about 0.25, from about 0.15 to about 0.22, or about 0.16.

Figure 5:
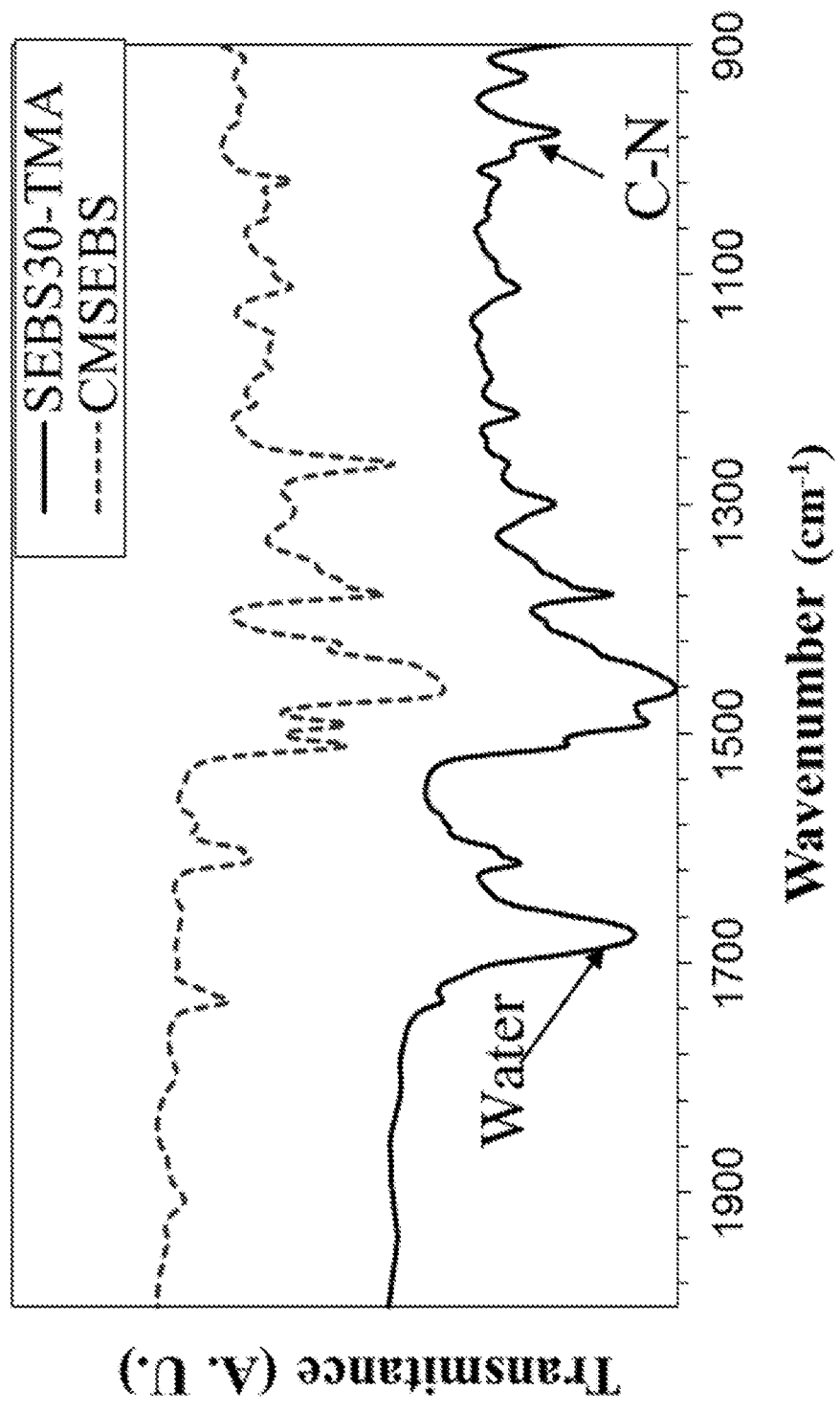
FIG. 5 is an exemplary embodiment of FTIR transmittance data for CMSEBS30 and SEBS30-TMA in accordance with the present disclosure.

FIG. 5 shows the FTIR spectra of SEBS30-TMA and CMSEBS30. A new FTIR peak at ca.893 cm$^{-1}$ was assigned to the C—N bond stretching, which confirmed the formation of the SEBS30-TMA AEM. Similar findings were obtained for SEBS35-TMA. Moreover, IEC determination confirmed the quaternization of CMSEBS and the completion of the reaction. Additional characterization for SEBS30-TMA, SEBS35-TMA, along with benchmark AEMs (Tokuyama A201) was performed (see Table 1, below).

TABLE 1

Properties of the SEBS-based AEMs synthesized in this work.

| | SEBS30-TMA | SEBS35-TMA | Tokuyama A201 |
|---|---|---|---|
| Experimental IEC (mmol/g) | 1.35 ± 0.02 | 1.93 ± 0.02 | 1.60 ± 0.09 |
| Chloride conductivity (@ 70° C., mS/cm) | 18 ± 3 | 34 ± 2 | 26 ± 3 |
| Ultimate tensile stress (MPa) | 3.1 ± 0.6 | 3.8 ± 0.2 | 78 ± 3 |
| Elongation at break (%) | 536 ± 7 | 499 ± 1 | 371 ± 14 |
| Water uptake (%) | 52.0 | 121.5 | 41 |
| Swelling ratio (%) | 56.9 | 254.0 | 47.3 |
| Perm-selectivity (%) | 73 | 51 | 80 |
| Transport numbers ($t_{cl^-}$; $t_{K^+}$) | (0.87; 0.13) | (0.76; 0.24) | (0.90; 0.10) |

Notes:
Data for Tokuyama A201 (benchmark AEM) were included for comparison purposes. The tensile tests were done at 25° C. and 100% relative humidity. Water uptake and swelling ratio measurement were performed at 30° C.

The experimental IEC was determined by using Volhard titration. The theoretical IECs calculated (from the relative areas of $^1$H NMR peaks "e", "b" and "d") for SEBS30-TMA and SEBS35-TMA were 1.52 mmol/g, and 1.99 mmol/g respectively. Quaternization reaction yields for SEBS30-TMA and SEBS35-TMA were 89% and 97%, respectively.

When the molar ratio of polystyrene in SEBS increases, the polymer backbone (and the AEM membranes resulting from it) becomes more rigid. When the molar ratio of rubber to styrene increases, the polymer backbone becomes more elastic. It is possible to tune the mechanical properties to make them adequate for the application by changing the molar ratio between polystyrene and rubber in the AEM. Tensile tests showed that SEBS-based AEMs (SEBS30-TMA and SEBS35-TMA) were very elastic (with elongations at break around 500% of initial length). Due to the rubber-like nature, the ultimate tensile strength was relatively low (3-4 MPa) when compared with other AEM materials. However, these AEMs are sufficiently strong to be assembled and operated for long periods of time in electrochemical cells. The elasticity of SEBS-based AEMs facilitates their assembly in electrochemical devices such as flow batteries or fuel cells, where they are compressed and subjected to stresses during long-term operation. The ultimate tensile stress for SEBS35-TMA was higher than that of SEBS30-TMA due to SEBS35-TMA having a larger molar ratio of styrene in the polymer backbone.

Membrane perm-selectivity and transport numbers were determined by measuring the voltage difference across the membrane in a diffusion cell, where the membrane was placed between two KCl solutions of different concentrations (0.5 M and 0.1 M). The transport number for Cl$^-$ in SEBS30-TMA was 0.87, which was very close to the benchmark AEM used herein (0.9). Anion transport numbers (and perm-selectivity) decreased when the AEM IEC increased (SEBS35-TMA). This was attributed to the presence of more ionic channels that allowed cationic species to permeate through membrane. In some embodiments, the perm-selectivity is from about 50% to about 80%, or from about 55% to about 80%, or from about 56% to about 74%, or about 74%.

Figure 6:
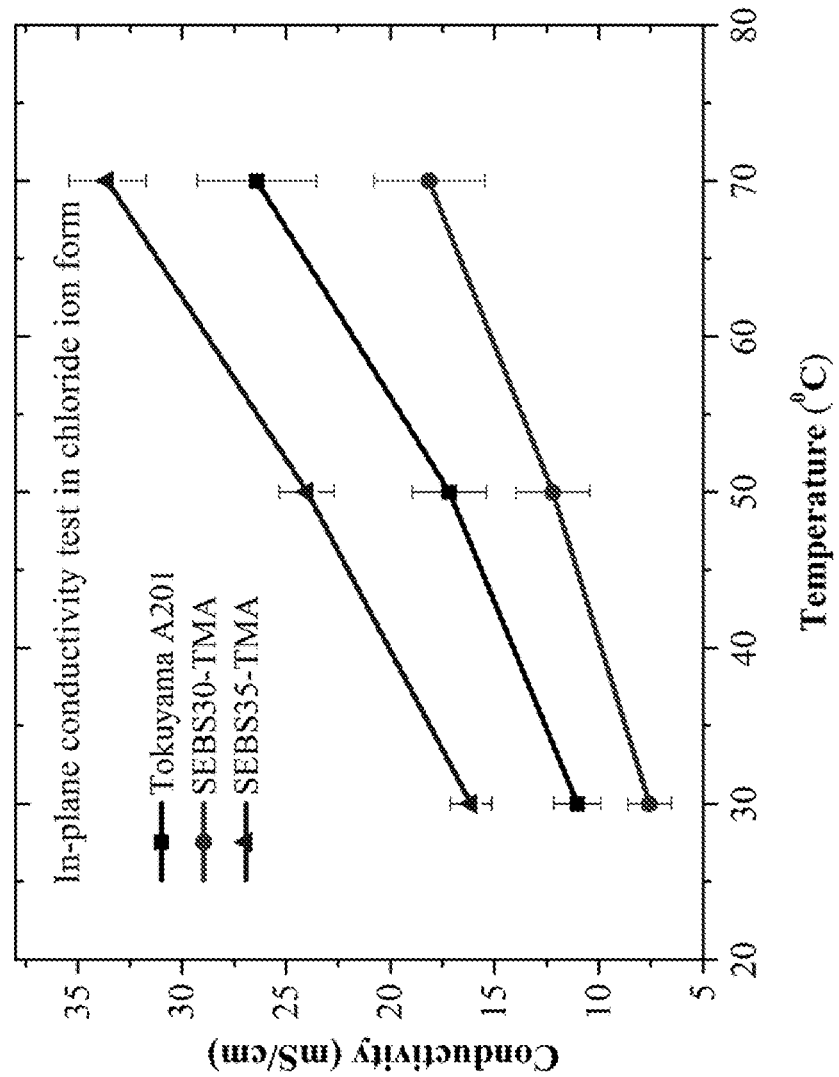
FIG. 6 is an exemplary embodiment of the chloride ion conductivity of SEBS-based AEMs and Tokuyama A210 in accordance with the present disclosure.

A four-probe (in-plane) conductivity cell was used to determine the AEM ionic (chloride form) conductivity (FIG. 6). The chloride conductivity of SEBS35-TMA was higher than that of the benchmark AEM at all temperatures. At 70° C., the chloride ionic conductivity of SEBS35-TMA was 34 mS/cm whereas it was 26 mS/cm for the benchmark AEM. Block copolymers provide a better pathway to access higher conductivities when compared with aromatic-backbone-based polymers such as poly(phenylene oxide) (PPO) and polysulfone (PSF). This is a consequence of the block copolymer's ability to yield a phase-separated morphology with wide and interconnected ionic channels that favor ion transport.

Figure 7:
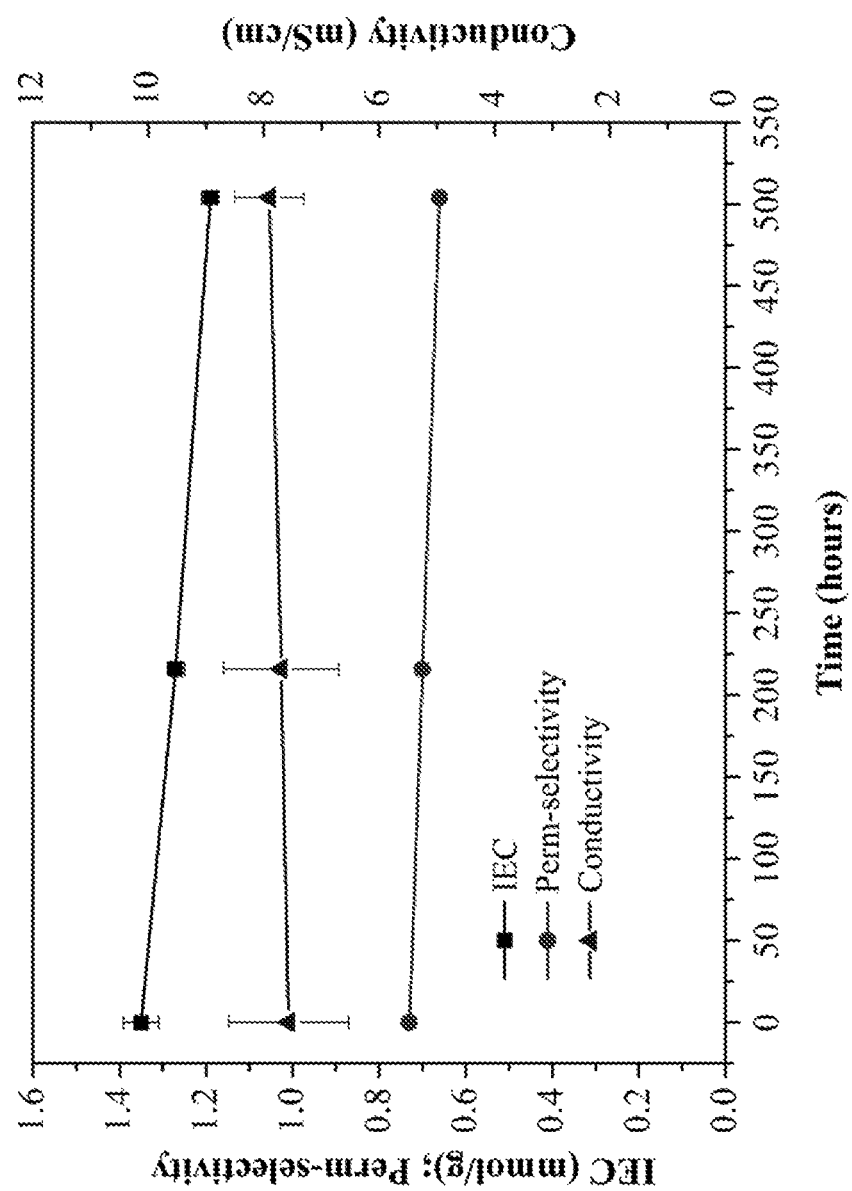
FIG. 7 is an exemplary embodiment of the chemical stability of SEBS30-TMA AEMs in 1.5M $VO_2^+$ dissolved in 3M $H_2SO_4$ in accordance with the present disclosure.

SEBS-based AEM oxidative stability was evaluated ex situ by immersion of the membranes in 1.5M VO$_2^+$+3M H$_2$SO$_4$ for up to 500 hours (FIG. 7). It was found that the IEC decreased from 1.35 mmol/g to 1.2 mmol/g (after 500 hours in the highly oxidizing vanadium (V) solution). The membrane perm-selectivity also decreased slightly from 0.73 to 0.66 (chloride transport number decreased from 0.87 to 0.83). No significant changes in the ionic conductivity were observed during the 500 hours of the test.

SEBS-based AEMs also showed excellent stability and performance in the vanadium/cerium RFB. An RFB operated with 0.5M V$^{2+}$/V$^{3+}$ anolyte and 0.5M Ce$^{4+}$/Ce$^{3+}$ catholyte (in 1M H$_2$SO$_4$) was run continuously with the SEBS30-based AEM separator for 60 charge-discharge cycles. After 60 charge-discharge cycles (350 hours), the RFB was disassembled and the membrane was characterized to identify signs of degradation. The IEC and the ionic conductivity of SEBS30-TMA dropped 18% and 20%, respectively. Tensile tests were also performed to assess any mechanical degradation of the AEM during operation inside the cell. No decrease in the ultimate stress and elongation at break were observed. Thus, these SEBS-based AEMs showed good stability in acidic electrochemical devices.

Figure 8:
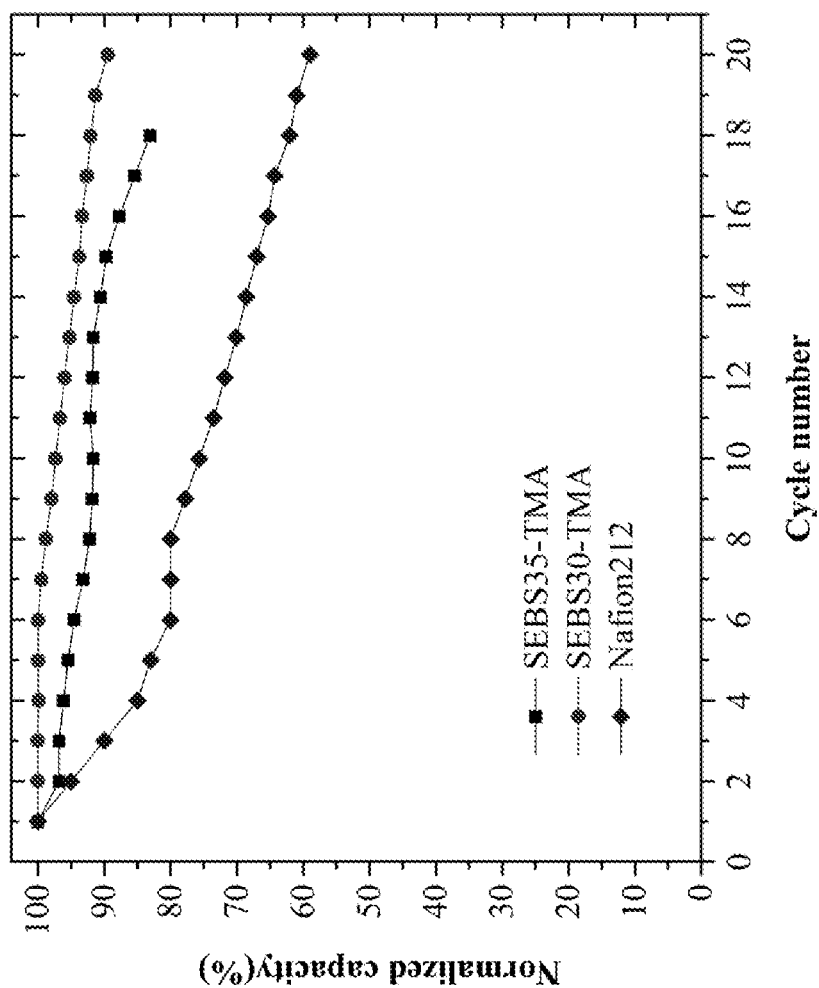
FIG. 8 is an exemplary embodiment of the change in capacity during V—Ce RFB charge/discharge cycling in accordance with the present disclosure. Comparison of RFBs assembled with the SEBS-based AEMs and with NAFION® 212.

FIG. 8 shows the changes in the RFB capacity (normalized by the initial capacity) of V—Ce RFBs run with SEBS30-TMA, SEBS35-TMA and NAFION® 212 separators. The RFBs were run continuously for up to 20 cycles by charge/discharge at a current density of 50 mA cm-2. The RFBs operated with SEBS-based AEMs showed much lower capacity loss during operation, where 10% capacity fade for SEBS30-TMA was observed after 20 cycles. In contrast, RFBs operated with NAFION® 212 separators yielded a capacity fade of 40% after 20 cycles. AEMs are selective for the passage of anions and largely reject the cations (active species) due to Donnan exclusion. This renders them more suitable for electrode-decoupled RFBs wherein cation transport from one electrode to the other is largely irreversible.

Figure 9:
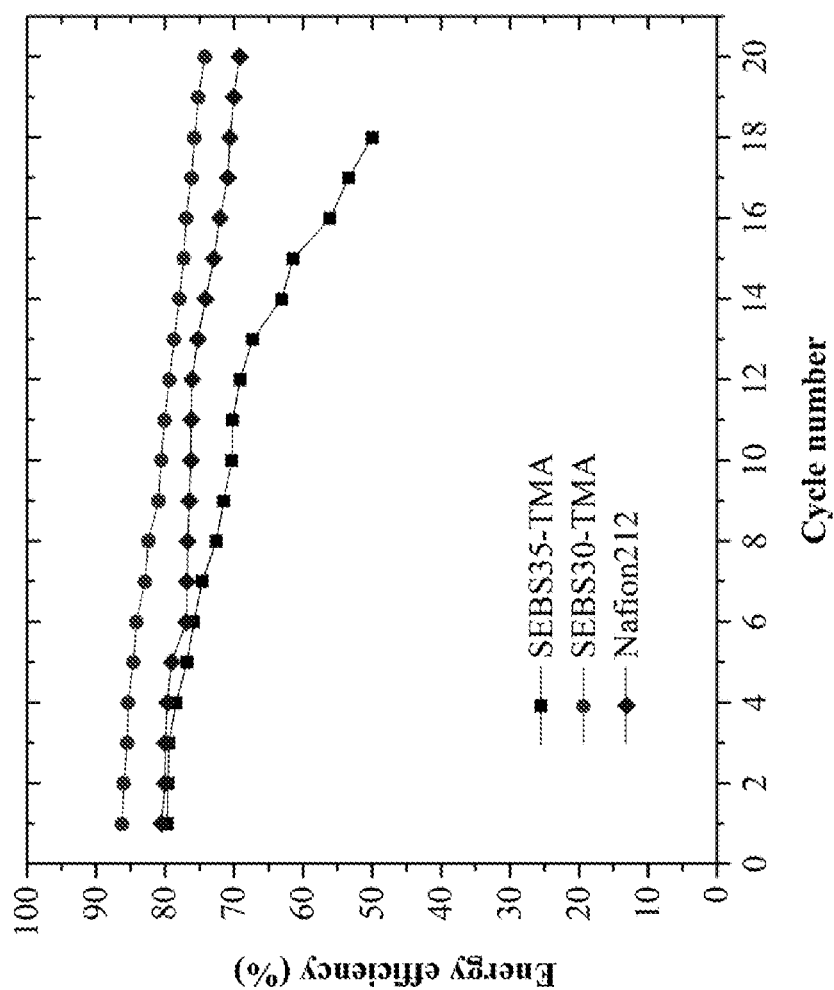
FIG. 9 is an exemplary embodiment of the energy efficiency for V—Ce RFBs assembled with the SEBS-based AEMs and NAFION® 212 as separators in accordance with the present disclosure.
Figure 10:
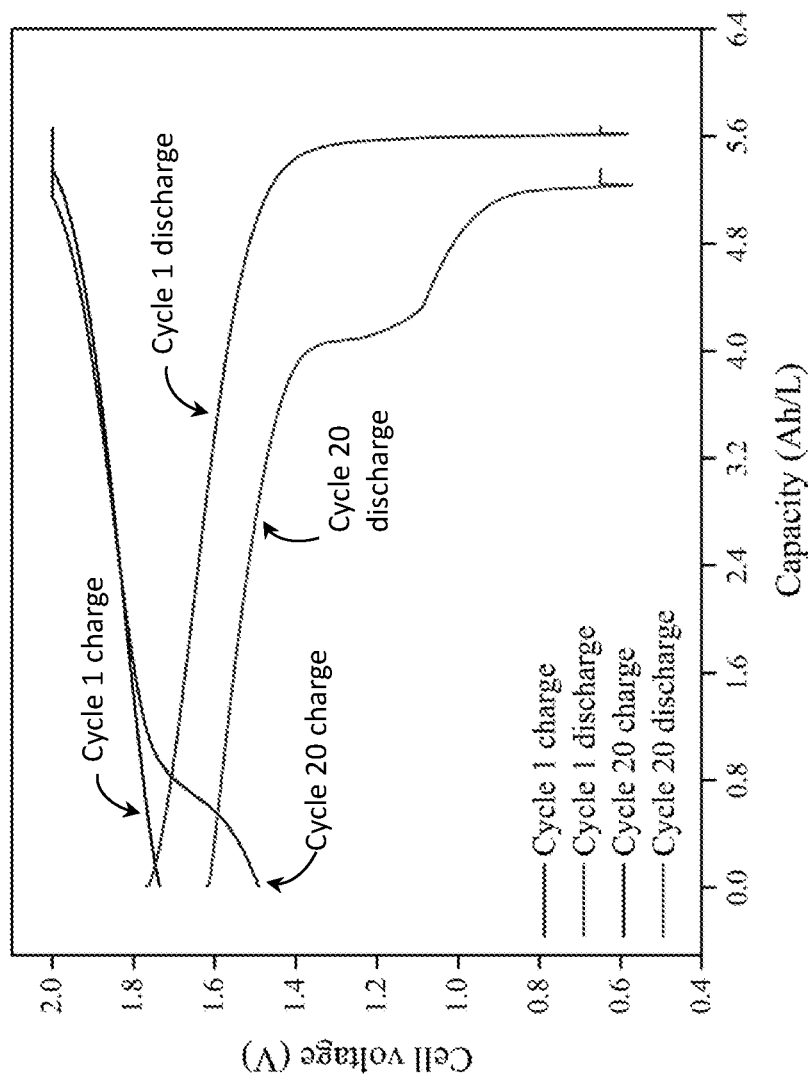
FIG. 10 is an exemplary embodiment of a V—Ce RFB charge/discharge curves using SEBS30-TMA AEM as the separator in accordance with the present disclosure.
Figure 11:
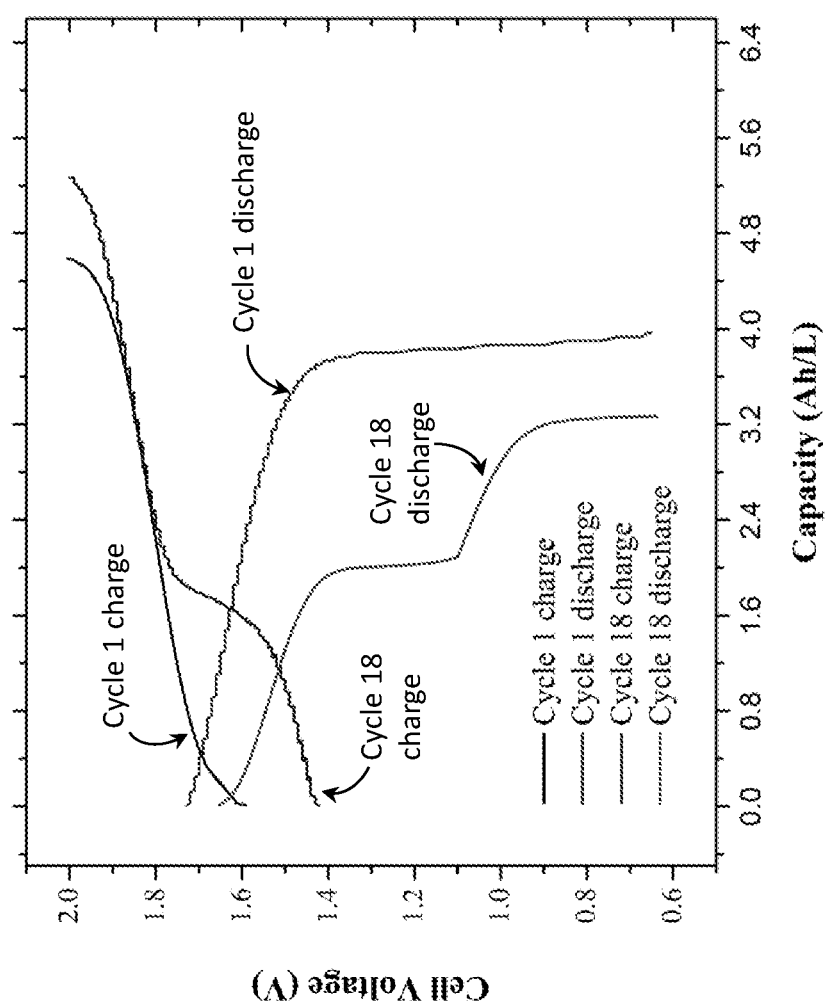
FIG. 11 is an exemplary embodiment of a V—Ce RFB charge/discharge curves using SEBS35-TMA AEM as the separator in accordance with the present disclosure.
Figure 12:
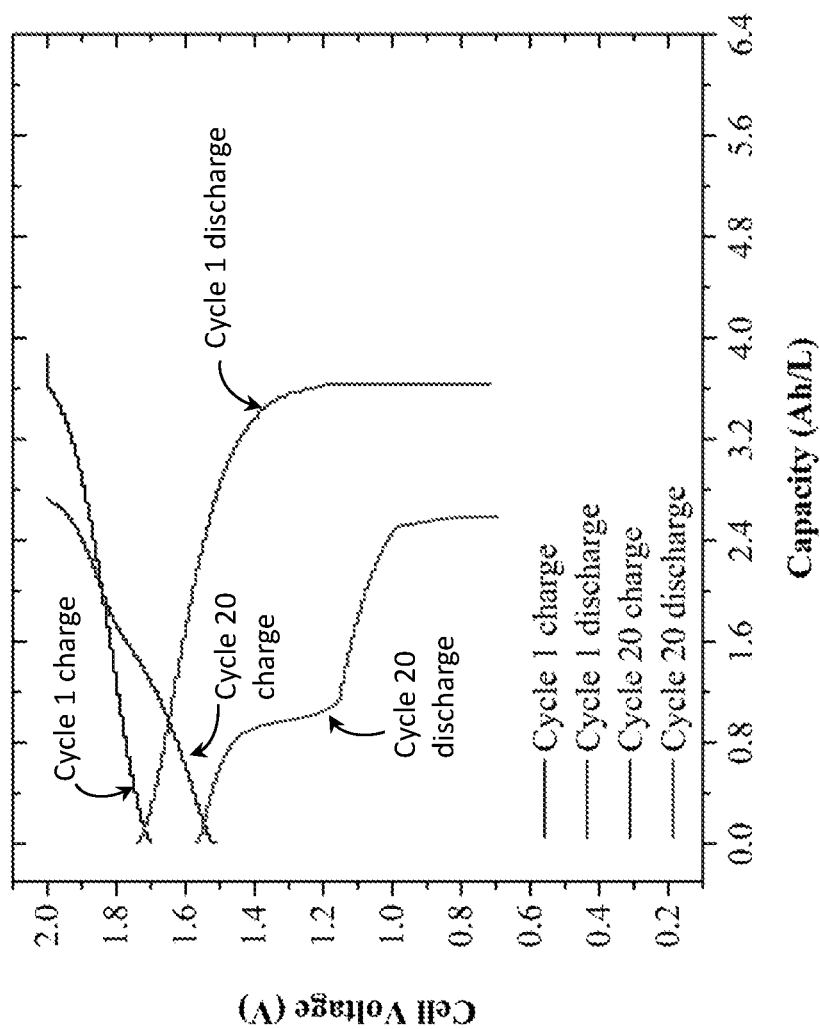
FIG. 12 is an exemplary embodiment of a V—Ce RFB charge/discharge curves using NAFION® 212 as the separator in accordance with the present disclosure.
Figure 13:
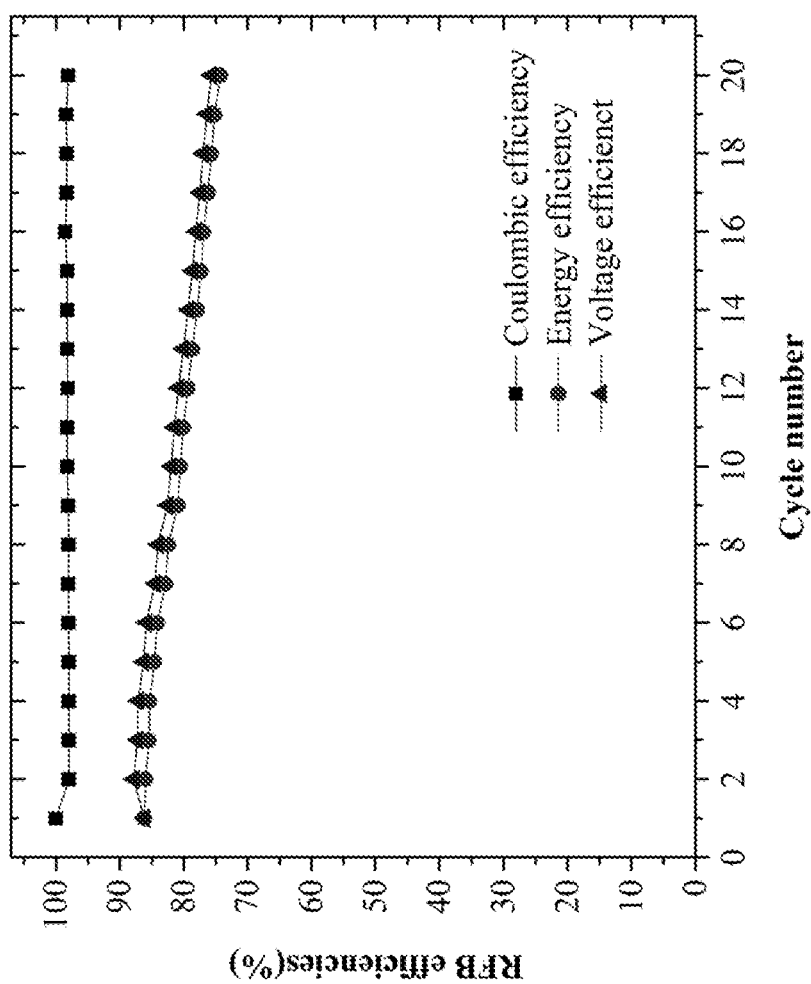
FIG. 13 is an exemplary embodiment of the RFB efficiency obtained using SEBS30-TMA as separator to run an V—Ce RFB in accordance with the present disclosure.

The initial energy efficiency (FIG. 9) for the batteries employing SEBS30-TMA, SEBS35-TMA, and NAFION® 212 were 86%, 80% and 80%, respectively. The RFB was charged and discharged at a current density of 50 mA cm-2. After about 20 charge/discharge cycles, the energy efficiency for SEBS30-TMA, SEBS35-TMA, and NAFION® 212 dropped 12%, 30% and 10%, respectively. FIGS. 10, 11, and 12 show the charge/discharge curves for cycles 1 and 20 for the three membrane separators. The decrease in RFB capacity and nominal voltage was more pronounced in NAFION® 212 and SEBS35-TMA than in SEBS30-TMA. Postmortem analysis exposed mechanical failure in SEBS35-TMA after 20 cycles. The efficiency drop arose not only from the membrane degradation, but also from the increase in kinetic losses (loss in activity of the carbon-felt electrodes). The coulombic efficiency for SEBS30-TMA and NAFION® 212 (see FIG. 13) remained constant (ca. 98%) throughout the test.

A series of polystyrene-block-poly(ethylene-ran-butylene)-block-polystyrene (SEBS)-based AEMs were synthesized via chloromethylation of SEBS followed by quaternization with trimethylamine (TMA) in accordance with the present disclosure. Reaction conditions allowed the synthesis of AEMs with large ionic conductivities (chloride ion conductivity of 34 mS/cm at 70° C.) and IECs (ca. 2 mmol/g). In comparison, the Tokuyama A201 benchmark had a chloride ion conductivity of 26 mS/cm and an IEC of 1.6 mmol/g.

An electrode-decoupled V—Ce RFB operated with SEBS30-TMA AEM as the separator showed lower capacity fade (10% after 20 cycles) than a similar RFB operated with NAFION® 212 as the separator (40% after 20 cycles). This confirmed that an AEM separator, by virtue of Donnan exclusion, exhibited enhanced selectivity towards anion vs. cation transport, thereby enabling the use of decoupled chemistries at the electrodes.

The oxidative stability of the SEBS-based AEM was evaluated ex situ for 500 hours by immersion in V(V) in concentrated acid. There was no change in the ionic conductivity over this timeframe. The membrane perm-selectivity (0.73 to 0.66) and IEC (1.35 mmol/g to 1.2 mmol/g) exhibited modest declines in this timeframe. In situ RFB experiments showed that after 60 charge-discharge cycles, the IEC and the ionic conductivity of SEBS30-TMA dropped by 18% and 20%, respectively. There was no measurable change in mechanical properties. The good chemical and mechanical stability, high ionic conductivities, and high perm-selectivity observed show that SEBS-based AEMs are excellent separator candidates for electrode-decoupled RFBs.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein.

In some embodiments, the terms "a" and "an" and "the" and similar references used in the context of describing a particular embodiment (especially in the context of certain of the following claims) are construed to cover both the singular and the plural, unless specifically noted otherwise. In some embodiments, the term "or" as used herein, including the claims, is used to mean "and/or" unless explicitly indicated to refer to alternatives only or to refer to the alternatives that are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and may also cover other unlisted steps. Similarly, any composition or device that "comprises," "has" or "includes" one or more features is not limited to possessing only those one or more features and may cover other unlisted features.

All methods described herein are performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member is referred to and claimed individually or in any combination with other members of the group or other elements found herein. One or more members of a group are included in, or deleted from, a group for reasons of convenience or patentability. When any such inclusion or deletion occurs, the specification is herein deemed to contain the group as modified thus fulfilling the written description of all Markush groups used in the appended claims.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

EXAMPLES

The following non-limiting examples are provided to further illustrate the present disclosure. It should be appreciated by those of skill in the art that the techniques disclosed in the examples that follow represent approaches the inventors have found function well in the practice of the present disclosure, and thus are considered to constitute examples of modes for its practice. However, those of skill in the art should, in light of the present disclosure, appreciate that many changes made in specific embodiments still obtain a like or similar result without departing from the spirit and scope of the present disclosure.

Example 1: Polystyrene-block-poly(ethylene-ran-butylene)-block-polystyrene Triblock Copolymer Separators for a Vanadium-Cerium Redox Flow Battery Experiments were performed in a flow battery by using the membranes disclosed herein. Improved performance (i.e., 4 times better than commercial membranes) was observed in terms of capacity retention. The battery was charged and discharged for at least 20 cycles (Approx. 100 hours of continuous operation). High IEC and tensile strength indicate that these membranes are suitable for high throughput water desalination applications, among others. The alkaline stability permits application in alkaline water electrolyzers to produce hydrogen.

Chloromethylated SEBS with a high DF were prepared and quaternized by reaction with trimethylamine to obtain SEBS-based AEMs. The SEBS-based AEMs were characterized by measuring their IEC, ionic conductivity, water uptake, mechanical properties (ultimate tensile strength and elongation at break), perm-selectivity, transport number and swelling ratio. 1H NMR spectroscopy was used to confirm the chloromethylation of SEBS and estimate the DF. FTIR spectroscopy was employed to confirm the quaternization of chloromethylated SEBS.

A V—Ce RFB using SEBS-based AEMs as separators was operated for several charge/discharge cycles to evaluate the AEM electrochemical stability and its effectiveness as a barrier. The RFB performance and cycling efficiencies were compared with a V—Ce RFB using NAFION® 212 as the separator. After 60 charge/discharge cycles, the SEBS-based AEM was disassembled from the cell and characterized to evaluate its in situ chemical stability. By immersing the membranes into the electrolyte solutions for 500 hours (ex situ), the oxidative stability of SEBS-based AEM was independently evaluated.

Materials

Chlorobenzene (99.5%), tin(IV) chloride (99.995%), chlorotrimethylsilane (99%), chloroform (99.5%), methanol (99.9%), paraformaldehyde (99.5%), silver nitrate (0.1N), potassium thiocyanate (0.1N), sodium nitrate (99%), chloroform-d (99.96%), 1-methyl-2-pyrrolidinone (99.7%), trimethylamine solution (31%-35% weight percent in ethanol), sulfuric acid (99.999%), vanadium (IV) oxide sulfate (97%) and cerium (IV) sulfate (97%) were purchased from Sigma Aldrich. SEBS (35:65 molar ratio of styrene to rubber) was sourced from Kraton Performance Polymers Inc. SEBS (Mn=118000, 30:70 molar ratio of styrene to rubber) was obtained from Sigma Aldrich.

Synthesis of Chloromethylated SEBS (CMSEBS)

SEBS (5 g) was dissolved in chlorobenzene (250 ml). Paraformaldehyde (16.7 g) was added into the mixture and the temperature was set to 55° C. Chlorotrimethylsilane (70.5 ml) and Tin (IV) chloride (1.3 ml) were added to mixture. The reaction temperature was set to 80° C., with a reaction time of 7 days. After the reaction, methanol was used to wash the mixture. The precipitated polymer was collected by filtration. Chlorobenzene (50 ml) and chloroform (200 ml) were used to dissolve the precipitated polymer. The purification process was repeated three times. During chloromethylation of SEBS (30:70 molar ratio of styrene to rubber) and SEBS (35:65 molar ratio of styrene to rubber), two polymers were obtained (CMSEBS30 and CMSEBS35) with different DF. From FIG. 3 and FIG. 4, the DF for CMSEBS30 was calculated to be 0.16 and the DF for CMSEBS35 to be 0.22 (mols of chloromethyl groups per mol of polymer repeat unit).

Synthesis of SEBS-Based AEMs (SEBS30-TMA and SEBS35-TMA)

SEBS30-TMA: CMSEBS30 (0.5 g) was dissolved in chlorobenzene (9 ml). The mixture was cast onto a 3.5 inch×3.5 inch glass plate and the solvent was evaporated in an oven at 60° C. The membrane was peeled off and placed together with trimethylamine (TMA) (1.17 ml) and 1-methyl-2-pyrrolidinone (NMP) (30 ml) into a round-bottom flask. The reaction was conducted at 30° C. for two days.

SEBS35-TMA: CMSEBS35 (0.5 g) was dissolved in chlorobenzene (9 ml). The mixture was cast onto a 3.5 inch×3.5 inch glass plate and the solvent was evaporated in an oven at 60° C. The membrane was peeled off and placed together with TMA (1.57 ml) and NMP (30 ml) into a round-bottom flask. The reaction was conducted at 30° C. for two days.

Ion Exchange Capacity, Ionic Conductivity, Water Uptake and Swelling Ratio

Ion exchange capacity—The IECs of membranes in chloride form were determined by the Volhard titration method. A vacuum dried SEBS-based AEM in the chloride form (dried at <0.1 inHg at 60° C. for 12 hours) was weighed (about 0.1 g) and immersed in 20 mL of 1 M sodium nitrate for 48 h at room temperature. Subsequently, 5.0 mL of 0.1 M silver nitrate was added to precipitate the chloride ions. An excess of silver was added to assure the complete precipitation of the chloride (a white silver chloride precipitate was observed if the membrane had any IEC). Then, 2-3 drops of 11 wt % iron (III) nitrate in DI water were added as indicator to detect the endpoint during the titration of the silver ions with thiocyanate. The solution was titrated with 0.1 M potassium thiocyanate (0.1 M KSCN, standard solution) until the color changed from a light orange to a medium-dark orange color (equivalence point). A control sample was prepared by mixing 20 mL of 1 M NaNO3 with 5.0 mL of 0.1 M AgNO3 and 2-3 drops of 11 wt % of Fe(NO3)3. The control was also titrated with 0.1 M KSCN and the difference in volume used to titrate the control solution and the sample solution was used for calculating the IEC (see equation [3]):

$$IEC_{Cl^-} [\text{mmol g}^{-1}] = \frac{(Vol_{cont.} - Vol_{rest}) \cdot 100 \text{ mM } KSCN}{Wt_{dry}} \quad [3]$$

where IECCl— was the experimental ion-exchange capacity (mmol g-1); Volcont. was the volume of 0.1 M KSCN used to titrate the control sample (L); Voltest. was the volume of 0.1 M KSCN used to titrate the sample (L); and Wtdry was the weight of the AEM (g)

Ionic conductivity—In-plane ionic conductivity measurements were carried out in a 4-point conductivity cell (BT-110, Scribner Associates) using electrochemical impedance spectroscopy (EIS) to measure the resistance. A 1 cm×3 cm membrane was placed in the PTFE conductivity cell in contact with the 4 platinum electrodes and immersed in a temperature controlled DI water bath. A Gamry series G750 potentiostat was used to measure the impedance in the frequency range 100 kHz to 0.1 Hz. The high frequency resistance was estimated from the Bode plots (corresponding to a phase angle of zero). The membrane conductivity was calculated using equation [4]:

$$\sigma = \frac{L}{R \cdot t \cdot w} \quad [4]$$

where σ was the in-plane membrane conductivity (mS cm-1); R was the in-plane membrane resistance (mOhm); t was the membrane thickness (fully hydrated) (cm); w was the membrane width (fully hydrated) (cm); L was the distance between the two inner electrodes (cm).

Water uptake—Vacuum dried samples (<1 inHg at 60° C. for at least 12 hours) in the chloride form were weighed (approx. weight of 0.1 g). The samples were then immersed in DI water and kept in an oven at 30° C. After 24 hours, the samples were quickly swabbed to remove surface water and then immediately placed into previously tared ZIPLOC® bags to measure their weight. Water uptake was determined using equation [5]:

$$WU = \frac{Wt_{hydrated} - Wt_{dry}}{Wt_{dry}} \cdot 100\% \quad [5]$$

where WU was the water uptake (%); Wthydrated was the weight of the fully-hydrated membrane (g); and Wtdry was the weight of the dry membrane (g). The dimensions (thickness, length and wide) of dry and fully hydrated membrane were measured and used to estimate the swelling ratio. The swelling ratio was defined as the percentage of volume increase from completely dry membrane to fully hydrated membrane.

Tensile Tests

The tensile tests for SEBS-based AEMs were performed using a Q800 differential mechanical analyzer (TA instruments) equipped with a humidity chamber. The membrane sample (approximate dimensions: 50 mm×5 mm×0.05 mm) was fixed in a film tension clamp using a torque of 3 lbF× in. The experiments were performed at 25° C. and 100% RH. The membrane was stretched at 0.5 MPa min-1 until the sample broke. The ultimate tensile strength and the elongation at the break point are reported in Table 1.

Perm-Selectivity and Transport Numbers

Membrane perm-selectivity and transport numbers were measured using the membrane potential method in a lab-made diffusion cell. The AEM was clamped between two well-stirred compartments containing different concentrations of the same salt (0.1M and 0.5 M KCl). Two identical calomel reference electrodes were used to measure the potential difference (Es (mV)) between the two solutions arising from the different mobilities of chloride and potassium ions through the membrane. The membrane potential was used to calculate the membrane perm-selectivity (selectivity of the anion exchange membrane towards anions) and the transport numbers (in this case for chloride and potassium). The following equation was used to calculate anion and cation transport numbers and membrane perm-selectivity:

$$E_m = (2t_- - 1)\left(\frac{RT}{F}\right)\ln\left(\frac{a_A}{a_B}\right) = (t_- - t_+)\left(\frac{RT}{F}\right)\ln\left(\frac{a_A}{a_B}\right) \quad [6]$$

where t+ and t− are the transport numbers for the cation (K+) and the anion (Cl—) respectively, aA and aB the activities of the electrolyte (KCl) at in the concentrated and diluted compartments separated by the membrane, T the absolute temperature, R is the gas constant and F is the Faraday constant. The coefficient (2t− −1) is commonly referred as the membrane perm-selectivity and represents the difference between the transport numbers for anions and cations.

NMR Characterization of the Polymers

NMR measurements were carried out on a Bruker Avance 360 MHz NMR spectrometer. The chloromethylated SEBS (CMSEBS) were characterized using 1H NMR (spectra collected at 360 MHz, 48 scans). The samples were prepared by dissolving 30-50 mg of polymer in 1 mL of deuterated solvent (chloroform-d). 35 μL of tetramethylsilane (TMS) was added as the internal standard for calibrating the chemical shift (δ=0 ppm for 1H).

FTIR Spectroscopy

The presence of functional groups was qualitatively confirmed by using FTIR spectroscopy. FTIR was performed using membrane films in a Bruker Tensor 27 instrument. The data was collected continuously in the range 4000 to 400 cm-1 at a resolution of 4 cm-1. All the samples were dried in a vacuum oven (at 60° C. for 12 hours) before the measurement to minimize the presence of water. Appropriate background corrections were also performed.

Single-Cell RFB Testing

RFB experiments were carried out in an acid-resistant single cell with an active area of 25 cm2 (Fuel Cell Technologies, Inc.). The RFB was assembled by sandwiching the SEBS-based AEM (with a thickness equivalent to NAFION®212) between two graphite felt electrodes (SGL Carbon, SIGRACELL® GFA6) previously activated by heating in an oven at 400° C. for 30 hours. The electrolyte in the negative compartment (150 mL) contained 0.5 M V2+ in 1M H2SO4. The positive compartment (150 mL) contained 0.5 M Ce4+ in 1M H2SO4. The active redox species were V3+/V2+ in the negative electrode and Ce4+/Ce3+ in the positive electrode. A redox cell test system (model 857, Scribner Associates, Inc.) comprising a fluid control unit and a potentiostat with impedance spectroscopy capabilities was employed in the experiments. System control and data acquisition were done using the Flow Cell software (Version 1.1, Scribner Associates, Inc.). The RFB was charged and discharged at a constant current density of 50 mAcm-2 at room temperature (approx. 21° C.). Both solutions were circulated through the electrodes using peristaltic pumps at a constant flow rate of 100 mL min-1. The RFB was considered charged once the cell voltage reached 2 V and discharged when the cell voltage dropped below 0.65 V (cutoff voltages).

The current efficiency (CE), energy efficiency (EE) and voltage efficiency (VE) were calculated using the following equations:

$$CE = Q_d/Q_c \times 100\% \qquad [7]$$

$$EE = E_d/E_c \times 100\% \qquad [8]$$

$$VE = EE/CE \times 100\% \qquad [9]$$

where Qd and Qc were the discharge and charge capacities (Ah/L), and Ed and Ec were the energy density (Wh/L) released during the discharge and consumed during charge, respectively.

In some embodiments, the RFB including the SEBS-based AEM has a current efficiency of from about 90% to 100%, from about 95% to about 100%, from about 97% to about 100%, or about 100%. In some embodiments, the RFB including the SEBS-based AEM has an energy efficiency of from about 70% to about 90%, from about 72% to about 85%, or about 85%. In some embodiments, the RFB including the SEBS-based AEM has a voltage efficiency of from about 70% to about 90%, from about 75% to about 86%, or about 86%.

To facilitate the understanding of the embodiments described herein, a number of terms are defined below. The terms defined herein have meanings as commonly understood by a person of ordinary skill in the areas relevant to the present disclosure. Terms such as "a," "an," and "the" are not intended to refer to only a singular entity, but rather include the general class of which a specific example may be used for illustration. The terminology herein is used to describe specific embodiments of the disclosure, but their usage does not delimit the disclosure, except as outlined in the claims.

All of the compositions and/or methods disclosed and claimed herein may be made and/or executed without undue experimentation in light of the present disclosure. While the compositions and methods of this disclosure have been described in terms of the embodiments included herein, it will be apparent to those of ordinary skill in the art that variations may be applied to the compositions and/or methods and in the steps or in the sequence of steps of the method described herein without departing from the concept, spirit, and scope of the disclosure. All such similar substitutes and modifications apparent to those skilled in the art are deemed to be within the spirit, scope, and concept of the disclosure as defined by the appended claims.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An acid stable anion exchange membrane (AEM) comprising:
    a chloromethylated polystyrene-block-poly(ethylene-ran-butylene)-block-polystyrene (SEBS) triblock copolymer, wherein a chloromethylation reaction yielding the chloromethylated SEBS triblock copolymer comprises chlorobenzene; and
    one or more functionalizing cations.

2. The acid stable AEM of claim 1, wherein the one or more functionalizing cations comprise at least one trimethylamine (TMA) cation.

3. The acid stable AEM of claim 1, wherein a molar ratio of styrene to (ethylene-ran-butylene) is from 30:70 to 55:45.

4. The acid stable AEM of claim 1, wherein a permselectivity is at least about 70%.

5. A redox flow battery comprising the acid stable AEM of claim 1, wherein a current efficiency of the redox flow battery is at least about 97%.

6. The acid stable AEM of claim 1, having a chloride ion conductivity at 70° C. of less than about 30 mS/cm.

7. The acid stable AEM of claim 1, having an ion exchange capacity of less than about 1.75 mmol/g.

8. A method for preparing an acid stable anion exchange membrane (AEM) comprising:
    chloromethylating a polystyrene-block-poly(ethylene-ran-butylene)-block-polystyrene (SEBS) triblock copolymer, wherein the chloromethylating comprises dissolving the SEBS triblock copolymer in chlorobenzene to form a mixture and allowing the mixture to react at about 80° C. for about 7 days; and
    functionalizing the SEBS triblock copolymer with at least one cation.

9. The method of claim 8, wherein the functionalizing is conducted at about 30° C. and for about 2 days.

10. The method of claim 8, wherein the at least one cation is a trimethylamine (TMA) cation.

11. The method of claim 8, wherein a molar ratio of styrene to (ethylene-ran-butylene) is from 30:70 to 55:45.

* * * * *